United States Patent
Lee et al.

(10) Patent No.: US 8,830,922 B2
(45) Date of Patent: Sep. 9, 2014

(54) METHOD FOR TRANSMITTING UPLINK CONTROL INFORMATION IN WIRELESS MOBILE COMMUNICATION SYSTEM

(75) Inventors: Dae Won Lee, Anyang-si (KR); Young Woo Yun, Anyang-si (KR); Joon Kui Ahn, Anyang-si (KR); Hak Seong Kim, Anyang-si (KR); Bong Hoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 12/866,187

(22) PCT Filed: Feb. 5, 2009

(86) PCT No.: PCT/KR2009/000559
§ 371 (c)(1),
(2), (4) Date: Aug. 4, 2010

(87) PCT Pub. No.: WO2009/099301
PCT Pub. Date: Aug. 13, 2009

(65) Prior Publication Data
US 2011/0026478 A1    Feb. 3, 2011

Related U.S. Application Data

(60) Provisional application No. 61/026,134, filed on Feb. 5, 2008.

(30) Foreign Application Priority Data

Feb. 3, 2009   (KR) .................. 10-2009-0008404

(51) Int. Cl.
*H04W 4/00*        (2009.01)
*H04L 1/16*        (2006.01)
*H04W 72/12*       (2009.01)
*H04L 1/00*        (2006.01)

(52) U.S. Cl.
CPC ............ *H04L 1/0028* (2013.01); *H04L 1/1664* (2013.01); *H04L 1/0026* (2013.01); *H04L 1/0068* (2013.01); *H04L 1/1671* (2013.01); *H04L 1/0073* (2013.01); *H04W 72/1284* (2013.01)
USPC .......................................... 370/329; 370/441

(58) Field of Classification Search
CPC ............................. H04W 28/00; H04W 72/00
USPC ............. 370/252, 260, 329, 335, 350, 395.1, 370/330, 331, 332, 441; 375/260; 455/447
See application file for complete search history.

(56) References Cited

U.S. PATENT DOCUMENTS 6,707,819 B1 *   3/2004   Fraser et al. ............... 370/395.1
2004/0022213 A1  2/2004   Choi et al.
(Continued)

*Primary Examiner* — Andrew Lai
*Assistant Examiner* — Sumitra Ganguly
(74) *Attorney, Agent, or Firm* — Lee, Hong, Degerman, Kang & Waimey

(57) ABSTRACT

A method for transmitting control information in uplink from a mobile terminal to a base station in a wireless mobile communication system is provided. In the method, when no data to be transmitted to the base station is present in the mobile terminal, Scheduling Request (SR) information and Channel Quality Indicator (CQI) information having a predetermined size or greater are multiplexed together and the multiplexed information is transmitted to the base station through a Physical Uplink Shared CHannel (PUSCH). This method prevents waste of uplink transmission resources while avoiding uplink data transmission delay.

9 Claims, 15 Drawing Sheets

(56) References Cited

U.S. PATENT DOCUMENTS

| | | | |
|---|---|---|---|
| 2006/0227888 A1* | 10/2006 | Khan | 375/260 |
| 2007/0183384 A1 | 8/2007 | Kwak et al. | |
| 2007/0274265 A1* | 11/2007 | Yoon et al. | 370/335 |
| 2008/0219370 A1* | 9/2008 | Onggosanusi et al. | 375/260 |
| 2008/0232333 A1* | 9/2008 | Jeong et al. | 370/336 |
| 2008/0311919 A1* | 12/2008 | Whinnett et al. | 455/447 |
| 2010/0202306 A1* | 8/2010 | Jersenius et al. | 370/252 |
| 2010/0279695 A1* | 11/2010 | Amirijoo et al. | 455/438 |

* cited by examiner

METHOD FOR TRANSMITTING UPLINK CONTROL INFORMATION IN WIRELESS MOBILE COMMUNICATION SYSTEM

CROSS-REFERENCE TO RELATED APPLICATIONS

This application is the National Stage filing under 35 U.S.C. 371 of International Application No. PCT/KR2009/000559, filed on Feb. 5, 2009, which claims the benefit of U.S. provisional application Ser. No. 61/026,134 filed on Feb. 5, 2008, and also claims the benefit of earlier filing date and right of priority to Korean patent application No. 10-2009-0008404 filed on Feb. 3, 2009, the contents of all of which are hereby incorporated by reference herein in their entirety.

TECHNICAL

The present invention relates to a wireless mobile communication system, and more particularly, to a method for transmitting control information in uplink in a system which uses SC-FDMA technologies.

BACKGROUND ART

In an uplink system which uses Single Carrier Frequency Division Multiplexing Access (SC-FDMA) technologies, information is generally transmitted through the following procedure. FIG. 1 illustrates an example block diagram illustrating SC-FDMA information transmission. As shown in FIG. 1, a serial information sequence for transmission is converted into a parallel sequence and Discrete Fourier Transform (DFT) is then performed on the parallel sequence. Then, Inverse Fast Fourier Transform (IFFT) is performed on the DFTed data. Here, the size of information inserted into IFFT indices need not be equal to the size of the IFFT index and the DFT result must be mapped to sequential IFFT input indices to be transmitted. A parallel sequence of values obtained through IFFT is then converted back to a serial sequence. A Cyclic Prefix (CP) is then added to the serial sequence to create a signal having an Orthogonal Frequency Division Multiplexing (OFDM) symbol structure. The created signal is then transmitted through an actual time/space medium.

In the case where DFT-precoded information is inserted into IFFT indices in an OFDM fashion, it is necessary to insert the information into sequential IFFT indices in order to achieve a low Peak to Average Power Ratio (PAPR) and a low Cubic Metric (CM) while maintaining single carrier characteristics. That is, it is necessary to insert the DFT-precoded information into sequential OFDM subcarriers. Therefore, when information is transmitted in uplink, even multiple types of information having different characteristics (for example, control information and data information) are multiplexed together and the multiplexed information is then transmitted in an OFDM fashion after DFT precoding. The term "data information" or "data" used in the present invention refers to data other than control information such as video or audio data.

FIG. 2 is a block diagram illustrating a procedure for processing an uplink transmission channel. As shown in FIG. 2, data information is segmented into a number of code blocks according to the size of a transport block for uplink transmission. A Cyclic Redundancy Check (CRC) code is then attached to each of the code blocks. Then, the code blocks are subjected to channel coding and rate matching processes and are then concatenated to create a single data information sequence. The data information sequence is multiplexed with the control information.

Control information that can be transmitted together with data in uplink is classified into two types. Specifically, such control information can be classified into Acknowledgement (ACK)/Negative Acknowledgement (NACK) information, which is information for confirmation of the receipt of downlink data, and other types of control information. A terminal or User Equipment (UE) transmits the ACK/NACK signal for the downlink data only when downlink data is present. A UE, which does not know if it will receive downlink data, transmits the two types of control information together with data in uplink while discriminating between the two types of control information since the UE may not know that it should transmit uplink ACK/NACK information even though it should transmit the uplink ACK/NACK information. Therefore, all instances of the terms "control information" described in the present invention refer to control information other than ACK/NACK information and the ACK/NACK information will be separately described.

When data is transmitted in uplink, the data can be transmitted together with control information or can be transmitted together with both control information and ACK/NACK information. Data may also be transmitted together with ACK/NACK information only. A transmission information sequence created by multiplexing data with control information or ACK/NACK information is transmitted using an SC-FDMA scheme.

All information that a terminal or User Equipment (UE) transmits in uplink is controlled by a base station or eNode B (eNB). When a UE has received data in downlink, the UE transmits ACK/NACK information in uplink in order to notify the eNB of whether or not the data has been successfully received. A Channel Quality Indicator (CQI) can be used to control data transfer rate. Using the CQI, the eNB can transmit data through a band providing a good channel quality response, thereby improving system performance. That is, the CQI is information that is fed back in uplink for transmission of downlink data. Therefore, the ACK/NACK information or the CQI can be considered information that is not associated with uplink data transmission but is associated with downlink data transmission.

On the other hand, a Scheduling Request (SR) is information that the UE transmits in uplink when new data for uplink transmission is created at a transmission buffer queue in the UE. When the eNB has received an SR from the UE, the eNB transmits control information in downlink to allow the UE to transmit the data. Therefore, the SR is information that is associated with uplink data transmission.

When the data, CQI, SR, and ACK/NACK information described above are transmitted in uplink, there is a problem of how to combine the data, CQI, SR, and ACK/NACK information for transmission.

DISCLOSURE OF INVENTION

Technical Problem

An object of the present invention devised to solve the problem lies on providing a method for transmitting control information in uplink, which prevents waste of uplink transmission resources while avoiding data transfer delay in a wireless mobile communication system.

Technical Solution

The object of the present invention can be achieved by providing a method for transmitting control information in uplink from a mobile terminal to a base station in a wireless mobile communication system, the method including multiplexing Scheduling Request (SR) information and Channel Quality Indicator (CQI) information having a predetermined size or greater when no data to be transmitted to the base station is present in the mobile terminal, and transmitting the multiplexed information to the base station through a Physical Uplink Shared CHannel (PUSCH).

Here, the method may further include jointly encoding the CQI information and the SR information before the multiplexing.

The method may further include separately encoding the CQI information and the SR information before the multiplexing.

The CQI information and the SR information may always be transmitted together to the base station.

The SR information may be scheduled to be transmitted at regular intervals to the base station, and the multiplexing may be performed only when a time at which the SR information is transmitted matches a time at which the CQI information is transmitted to the base station through a Physical Uplink Shared CHannel (PUSCH).

In another aspect of the present invention, provided herein is a method for transmitting control information in uplink from a mobile terminal to a base station in a wireless mobile communication system, the method including receiving, from the base station, a grant for transmission of data from the mobile terminal, encoding, when data to be transmitted to the base station, other than the data granted for transmission, is present in the mobile terminal, information indicating the presence jointly with the data granted for transmission, and transmitting the encoded result to the base station through a Physical Uplink Shared CHannel (PUSCH).

Here, the information may be 1-bit information.

Advantageous Effects

According to the present invention, it is possible to prevent waste of uplink transmission resources while avoiding data transfer delay in a wireless mobile communication system.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
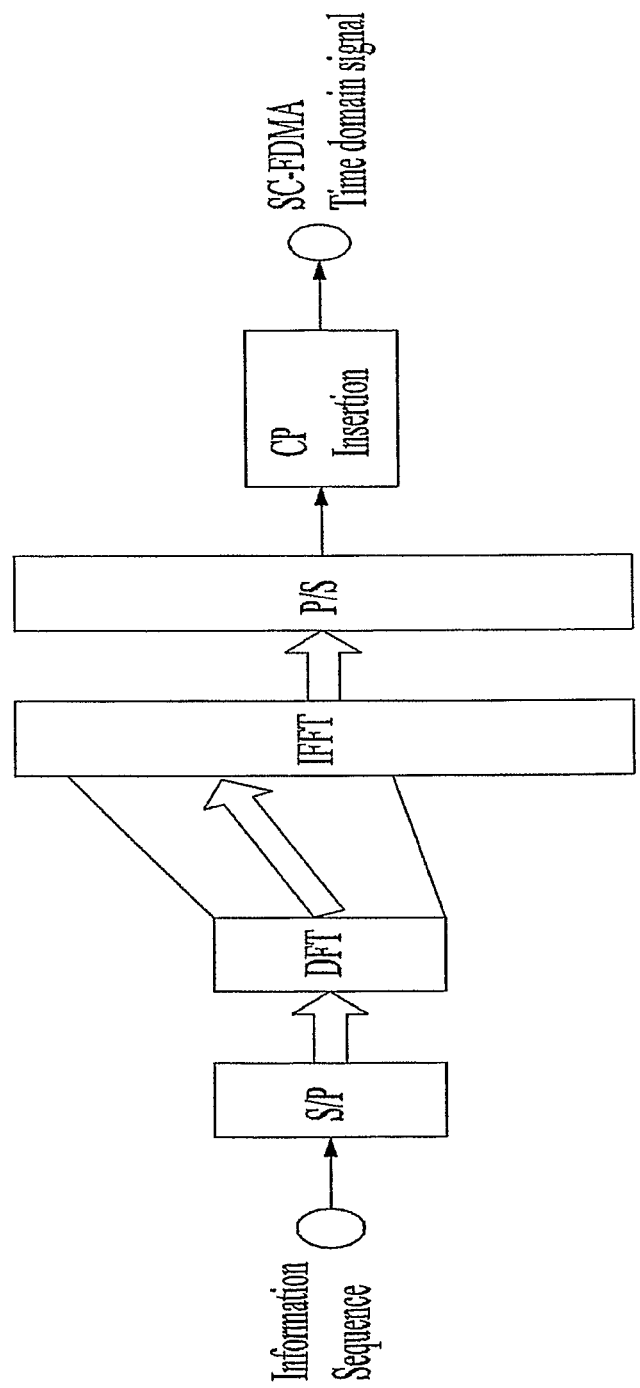
FIG. 1 illustrates an example block diagram illustrating SC-FDMA information transmission.
Figure 2:
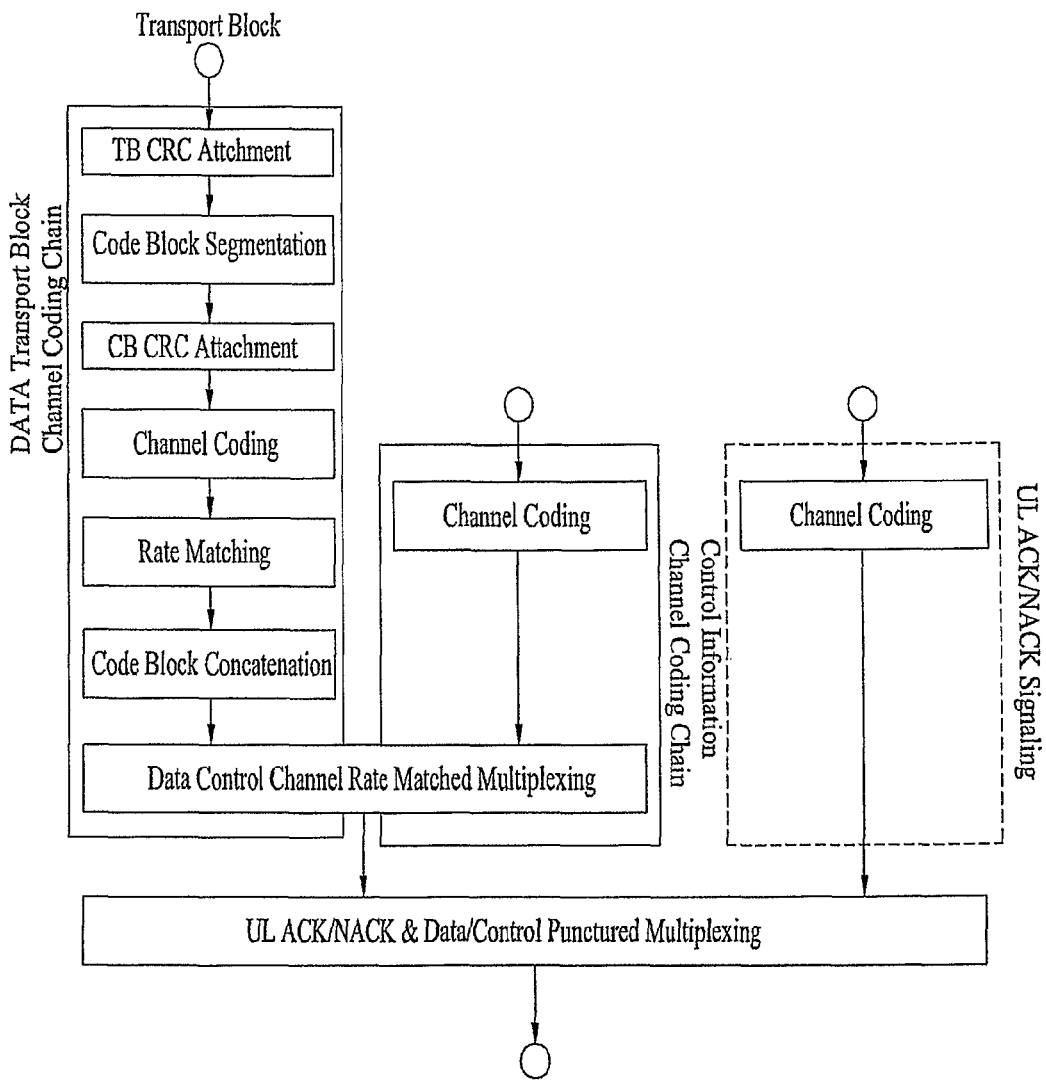
FIG. 2 is a block diagram illustrating a procedure for processing an uplink transmission channel.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

Information to be transmitted in uplink typically includes uplink data, a Channel Quality Indicator (CQI), Acknowledgement (ACK)/Negative Acknowledgement (NACK) information, and Scheduling Request (SR) information. Of course, the information to be transmitted in uplink also includes a Sounding Reference Signal (SRS) for the frequency domain scheduling of a data channel and a Random Access Channel (RACH) transmitted when a mobile terminal or User Equipment (UE) needs to establish a communication channel with a base station or eNode B (eNB) at an initial stage of communication. However, for ease of explanation, the following description of the present invention will be given of methods for combining only the four types of information (data, a CQI, ACK/NACK information, and SR information) described above when transmitting them in uplink and structures for transmitting only the four types of information.

Signals transmitted in uplink should have a low Peak to Average Power Ratio (PAPR) to allow the UE to use a low-price power amplifier. A value other than the PAPR, which affects the linear range of the power amplifier, is a Cubic Metric (CM). To achieve a low PAPR and a low CM, it is necessary to use an SC-FDMA scheme when transmitting Information. That is, when different types of information to be transmitted in uplink (for example, an ACK/NACK and a CQI) are present, the information should be transmitted through one physical transmission channel to achieve transmission with a low PAPR and a low CM. Here, the physical transmission channel is an information transmission channel that is designed to achieve a low PAPR and a low CM.

The present invention suggests a method for transmitting data, a CQI, ACK/NACK information, and SR information through two uplink physical channels in a system which uses the uplink physical channels. Here, the two uplink physical channels are a Physical Uplink Control Channel (PUCCH) and a Physical Uplink Shared Channel (PUSCH). The PUCCH and the PUSCH have different characteristics. The PUCCH is a physical channel that carries control information associated with downlink control information, control information associated with uplink transmission, or the like and supports a low number of bits and also has a small bandwidth. The PUSCH supports a range from a small number of bits to a very large number of bits and carries control information and data information.

Information is not allowed to be transmitted simultaneously through the two physical channels so as to achieve a low PAPR and a low CM. That is, the UE should transmit information in uplink through one of the PUCCH and the PUSCH at a specific time. Therefore, ACK/NACK information and SR information which contain a small amount of information are generally transmitted through a PUCCH and a CQI which contains a variable amount of information can be transmitted through a PUCCH or a PUSCH. Here, the CQI which is transmitted through a PUCCH since it contains a small amount of information is referred to as "CQI type 1" and the CQI which is transmitted through a PUSCH only since it contains a large amount of information is referred to as "CQI type 2". Although the data contains a highly variable amount of information, the data is transmitted through only the PUSCH since it generally contains a very large amount of information.

Since the CQI and the ACK/NACK information, which are transmitted through the PUCCH, are associated with downlink data, the CQI and the ACK/NACK information cannot always be transmitted at a different time from the time when data is transmitted through the PUSCH. Accordingly, due to the requirement that uplink transmission signals should maintain both the PAPR and the CM at a low level, a problem occurs when ACK/NACK information or CQI type 1 is transmitted or when both ACK/NACK information and CQI type 1 are transmitted together at the same time as when data is transmitted through a PUSCH. A problem also occurs when ACK/NACK information or SR information is transmitted or when both ACK/NACK information and SR information are transmitted together at the same time as when CQI type 2 is transmitted through a PUSCH.

The case where information is transmitted through the PUSCH can be classified into two cases. The first case is that data is transmitted through the PUSCH and the second case is that CQI type 2 instead of data is transmitted through the PUSCH.

First, reference is made to a method for transmitting control information in uplink in the case where data is transmitted through a PUSCH according to a first embodiment of the present invention.

Figure 3:
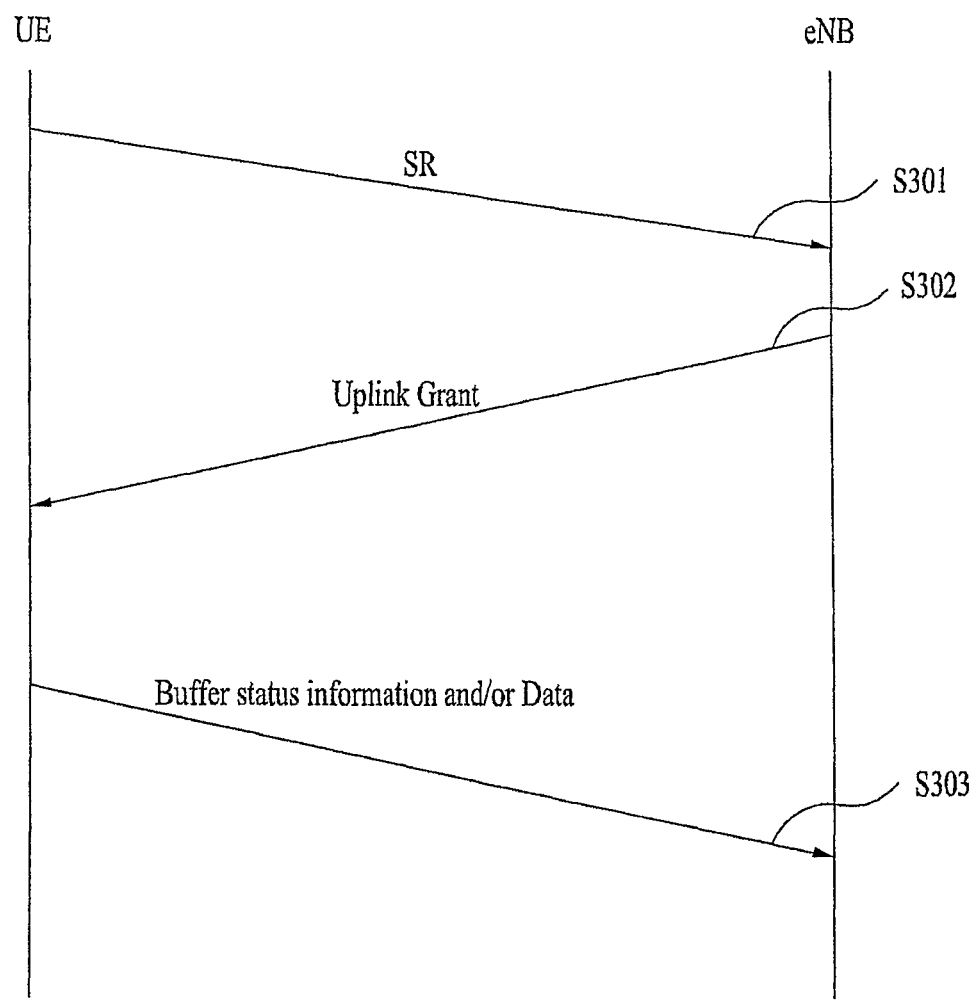
FIG. 3 briefly illustrates a procedure in which a UE transmits data and control information to an eNB.

FIG. 3 briefly illustrates a procedure in which a UE transmits data and control information to an eNB. As shown in FIG. 3, the UE checks whether or not it is possible to transmit an SR and then transmits the SR to the eNB when it is possible to transmit the SR (S301). Upon receiving the SR, the eNB transmits an uplink grant signal to the UE (S302). Upon receiving the uplink grant signal, the UE transmits data through a PUSCH (S303). Here, a problem may occur when the status of a buffer of the UE has been changed when the UE has received the uplink grant signal from the eNB.

For example, when new data is input to a buffer queue in the UE while other data awaits transmission in the buffer queue, the UE needs to notify the eNB of the buffer status change. Information indicating such a buffer status change of the UE is referred to as "buffer status information." However, time delay occurs until the new data is transmitted if the UE transmits the buffer status information in a next period instead of transmitting the buffer status information together with the data that is to be currently transmitted. There is another problem in that it is not possible to maintain the PAPR and the CM at a low level if the UE transmits the buffer status information using a separate channel from the channel through which the data is transmitted.

To overcome these problems, the present invention suggests that, when data is transmitted through a PUSCH, the buffer status information be encoded jointly with the data and then be transmitted through the PUSCH. That is, according to the present invention, the buffer status information and the data are not transmitted through separate physical channels. The buffer status information may be 1-bit information indicating whether or not a buffer status change has occurred. Since the buffer status information is not transmitted through the PUCCH but instead is encoded jointly with the data to be transmitted through the PUSCH, it is possible to prevent data transmission delay while maintaining the PAPR and the CM at a low level.

The case where buffer status information and data are encoded jointly to be transmitted through a PUSCH can be divided into five cases.

Figure 4:
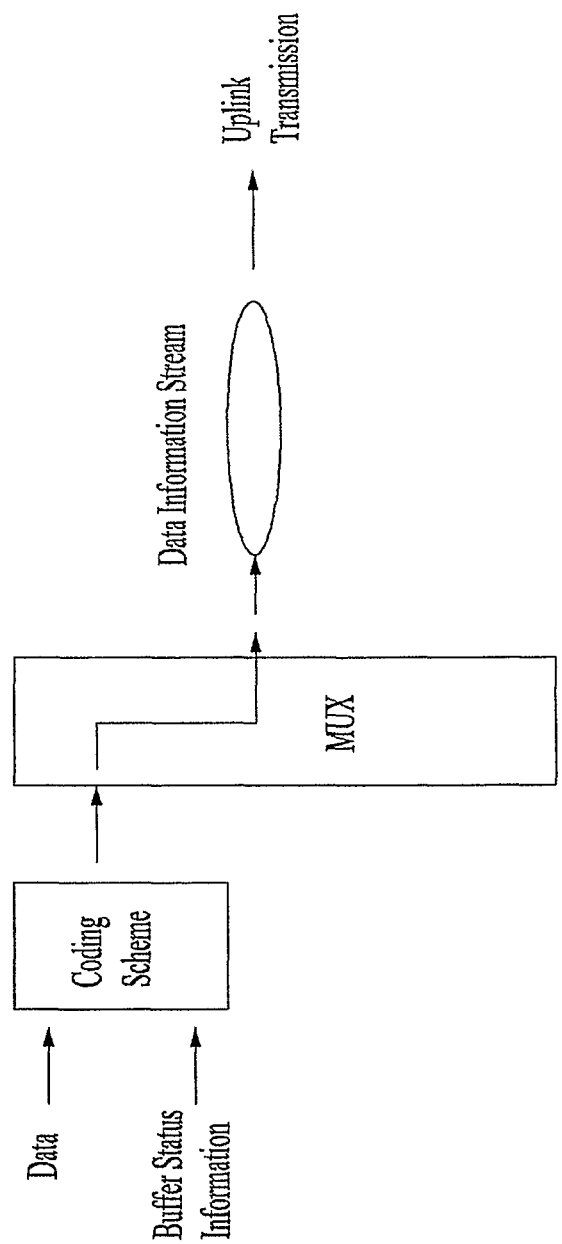
FIG. 4 is a block diagram illustrating the first case where data is transmitted through a PUSCH according to a first embodiment of the present invention.

The first case is that only the two types of information, data and buffer status information, are transmitted through a PUSCH. FIG. 4 is a block diagram illustrating the first case where data is transmitted through a PUSCH according to the first embodiment of the present invention. As shown in FIG. 4, the buffer status information is encoded jointly with the data, and the encoded data is then multiplexed to create a data information stream, and the data information stream is then transmitted through a PUSCH.

Figure 5:
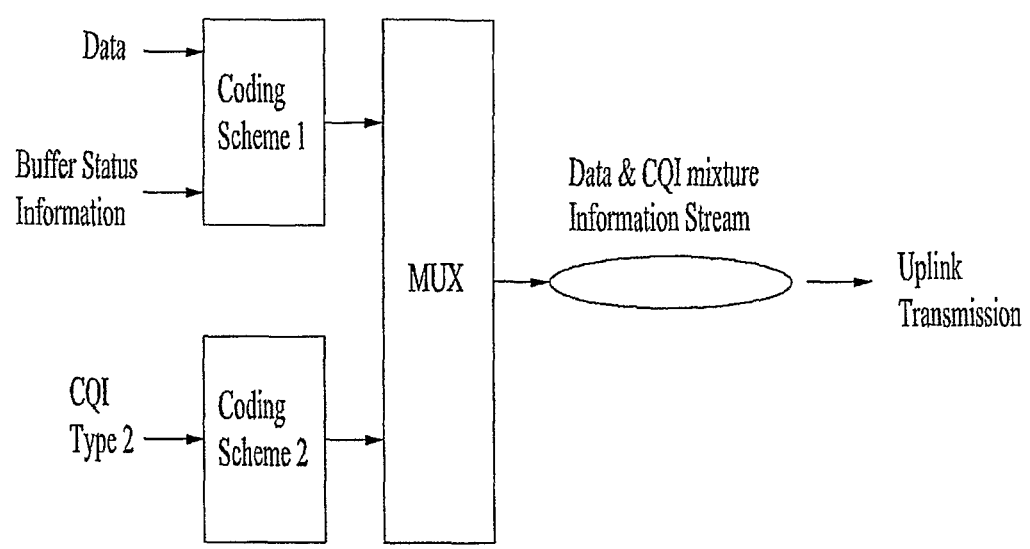
FIG. 5 is a block diagram illustrating the second case where data is transmitted through a PUSCH according to the first embodiment of the present invention.

The second case is that data, buffer status information, and CQI type 2 are transmitted through a PUSCH. FIG. 5 is a block diagram illustrating the second case where data is transmitted through a PUSCH according to the first embodiment of the present invention. As shown in FIG. 5, the buffer status information is encoded jointly with the data and the CQI type 2 is separately encoded. The encoded data and the encoded CQI type 2 are then multiplexed to create a data/CQI mixture information stream, and the information stream is then transmitted in uplink through a PUSCH.

Figure 6:
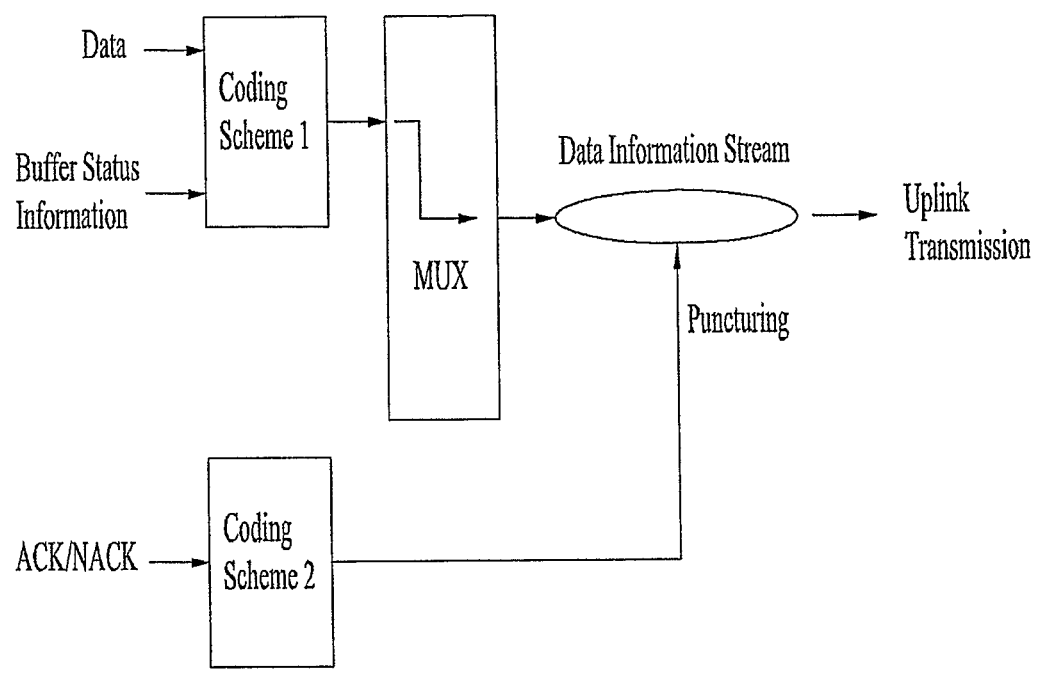
FIG. 6 is a block diagram illustrating the third case where data is transmitted through a PUSCH according to the first embodiment of the present invention.

The third case is that data, buffer status information, and ACK/NACK information are transmitted through a PUSCH. FIG. 6 is a block diagram illustrating the third case where data is transmitted through a PUSCH according to the first embodiment of the present invention. As shown in FIG. 6, the data and the buffer status information are encoded jointly to create a data information stream and the ACK/NACK information is inserted into the stream through puncturing and the stream with the ACK/NACK information inserted therein is then transmitted in uplink through a PUSCH. The puncturing is a method in which some bits are removed from the data information stream and ACK/NACK information bits are inserted into the stream at the removed bit positions such that the ACK/NACK information is multiplexed with the stream without changing the total length of the stream.

Figure 7:
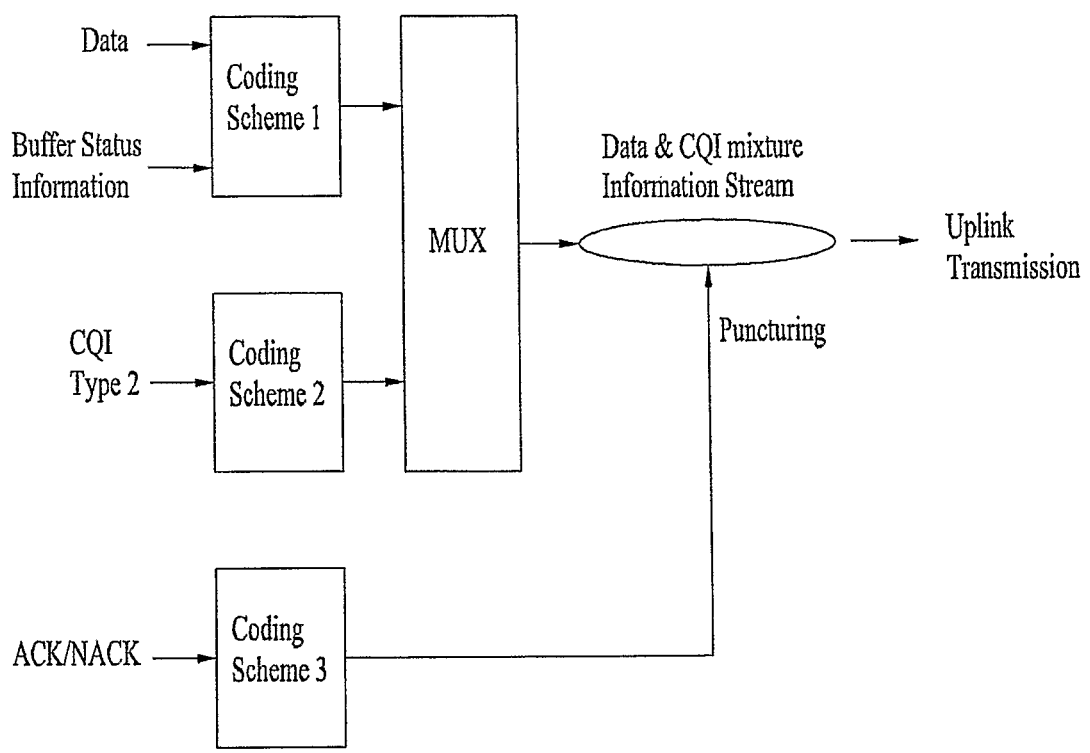
FIG. 7 is a block diagram illustrating the fourth case where data is transmitted through a PUSCH according to the first embodiment of the present invention.

The fourth case is that data, buffer status information, CQI type 2, and ACK/NACK information are transmitted through a PUSCH. FIG. 7 is a block diagram illustrating the fourth case where data is transmitted through a PUSCH according to the first embodiment of the present invention. As shown in FIG. 7, the data and the buffer status information are encoded jointly and the CQI type 2 is separately encoded. The encoded data and the encoded CQI type 2 are then multiplexed to create a data/CQI mixture information stream and the ACK/NACK information is then inserted into the data information stream through puncturing. The stream with the ACK/NACK information inserted therein is then transmitted in uplink through a PUSCH.

Figure 8:
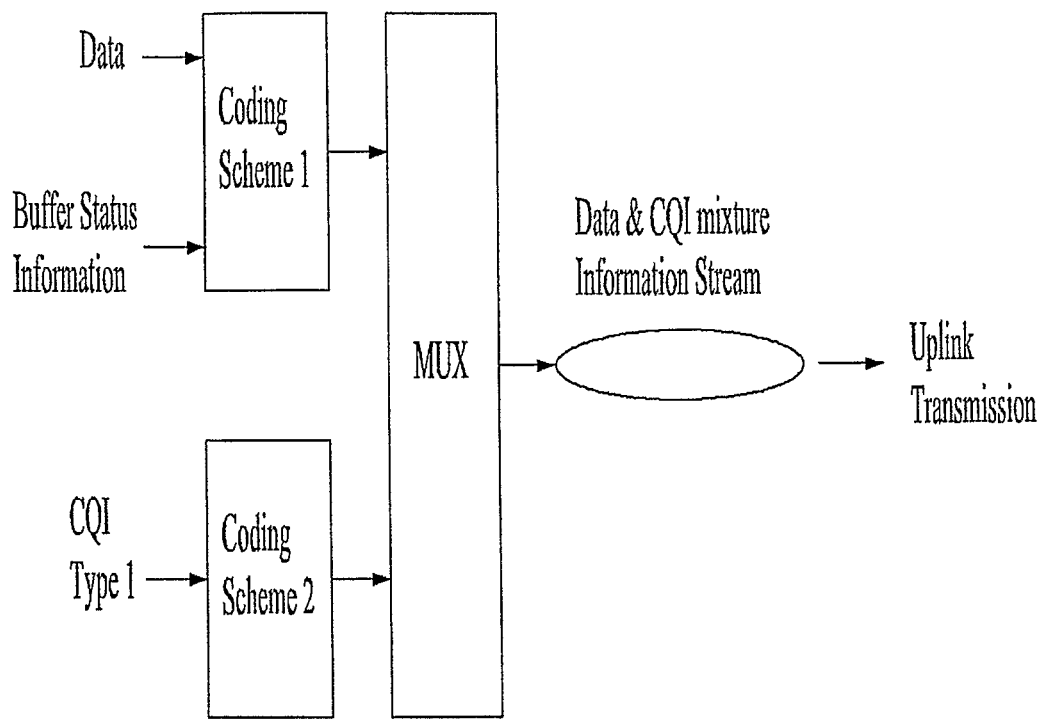
FIG. 8 is a block diagram illustrating the fifth case where data is transmitted through a PUSCH according to the first embodiment of the present invention.

The fifth case is that data, buffer status information, and CQI type 1 are transmitted through a PUSCH. FIG. 8 is a block diagram illustrating the fifth case where data is transmitted through a PUSCH according to the first embodiment of the present invention. The system can be configured such that the CQI type 1 is transmitted at regular intervals through a PUCCH. As shown in FIG. 8, when data to be transmitted in uplink is created at the same time as when CQI type 1 is to be transmitted, the data and the buffer status information are encoded jointly and the CQI type 1 is separately encoded. The encoded data and the encoded CQI type 1 are then multiplexed to create a data/CQI mixture information stream, and the created stream is then transmitted in uplink through a PUSCH. That is, when data to be transmitted in uplink is created at the same time as when CQI type 1 is to be transmitted, the CQI type 1 and the data are multiplexed and transmitted in uplink through a PUSCH.

Figure 9:
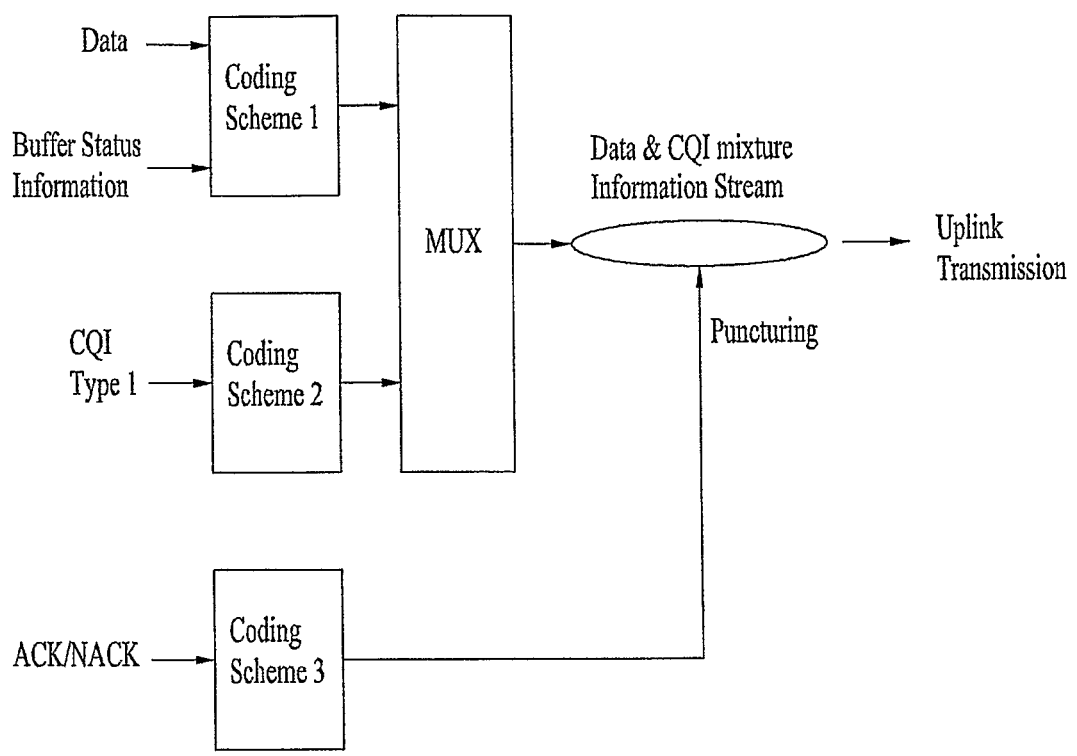
FIG. 9 is a block diagram illustrating the sixth case where data is transmitted through a PUSCH according to the first embodiment of the present invention.

The sixth case is that data, buffer status information, CQI type 1, and ACK/NACK information are transmitted through a PUSCH. FIG. 9 is a block diagram illustrating the sixth case where data is transmitted through a PUSCH according to the first embodiment of the present invention. The system can be configured such that the CQI type 1 is transmitted at regular intervals through a PUCCH. As shown in FIG. 9, when data to be transmitted in uplink is created at the same time as when CQI type 1 is to be transmitted, the data and the buffer status information are encoded jointly and the CQI type 1 is separately encoded. The encoded data and the encoded CQI type 1 are then multiplexed to create a data/CQI information stream, and ACK/NACK information is then inserted into the information stream through puncturing. The stream with the ACK/NACK information inserted therein is transmitted in uplink through a PUSCH.

Reference will now be made to a method for transmitting control information in the case where CQI type 2 rather than data is transmitted through a PUSCH according to a second embodiment of the present invention.

Figure 10:
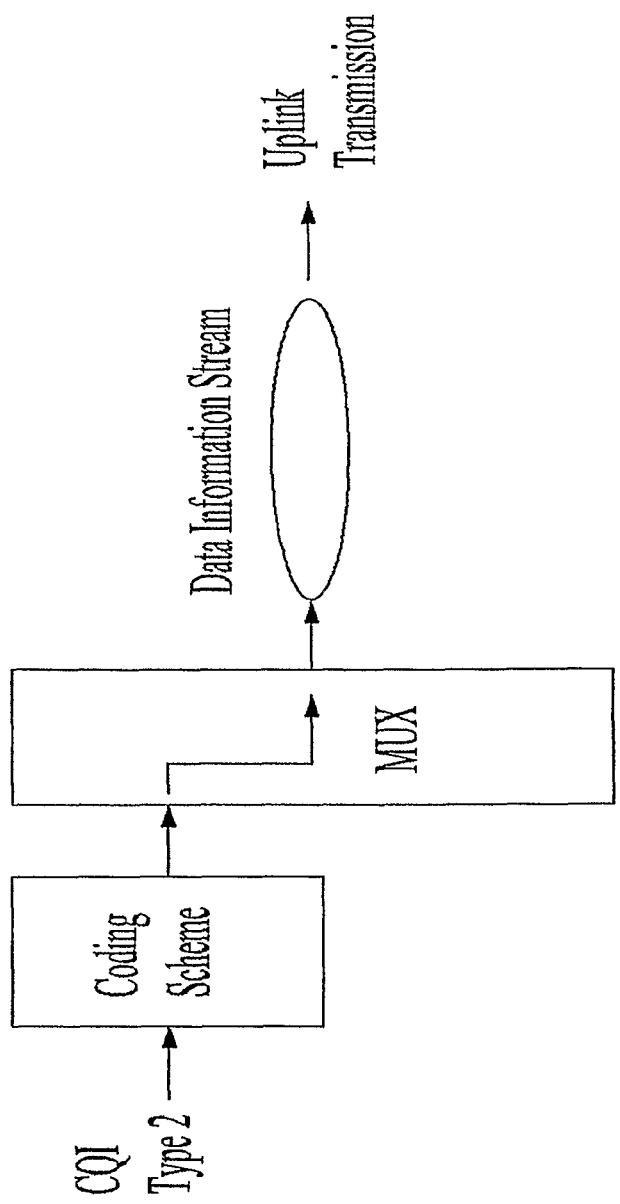
FIG. 10 is a block diagram illustrating the case where a CQI alone is transmitted in uplink through a PUSCH when there is no need to transmit data according to a second embodiment of the present invention in uplink.

FIG. 10 is a block diagram illustrating the case where a CQI alone is transmitted in uplink through a PUSCH when there is no need to transmit data in uplink according to the second embodiment of the present invention.

Figure 11:
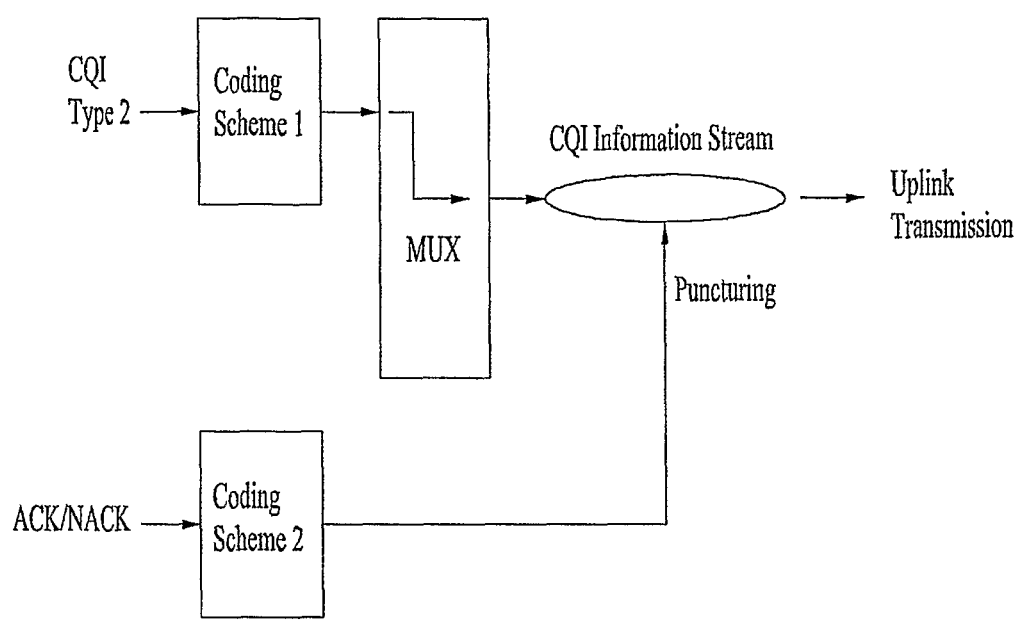
FIG. 11 is a block diagram illustrating the case where a CQI and ACK/NACK information are transmitted in uplink through a PUSCH when there is no need to transmit data according to the second embodiment of the present invention in uplink.

FIG. 11 is a block diagram illustrating the case where a CQI and ACK/NACK information are transmitted in uplink through a PUSCH when there is no need to transmit data in uplink according to the second embodiment of the present invention.

The case where data is not transmitted through a PUSCH can be classified into case A illustrated in FIG. 10 and case B illustrated in FIG. 11. In the cases A and B, it is possible to additionally transmit SR information through multiplexing. When new data to be transmitted in uplink is created at a transmission buffer of a mobile terminal or User Equipment (UE) at the same time as when CQI type 2 or both a CQI type 2 and ACK/NACK information are transmitted, the UE needs to notify the eNB of that fact. If the system supports a structure in which CQI type 2 or both a CQI type 2 and ACK/NACK information without SR information are transmitted while data is not transmitted, there is a need to additionally transmit SR information. The additional transmission of the SR information increases the time for awaiting uplink data transmission and also causes waste of resources since the SR information is transmitted through a PUCCH. Therefore, in the case where CQI type 2 or both a CQI type 2 and ACK/NACK information are transmitted through a PUSCH while no data to be transmitted is present, SR information is multiplexed with the CQI type 2 or both the CQI type 2 and the ACK/NACK information and the multiplexed information is then transmitted in uplink through the PUSCH.

The case where SR information is multiplexed and transmitted through a PUSCH can be classified into two cases according to system operation.

The first case is that SR information, which is set to be transmitted at regular intervals through a PUCCH, is transmitted in uplink through multiplexing with CQI type 2 or both CQI type 2 and ACK/NACK information only when the time to transmit the SR information matches the time when the CQI type 2 or both the CQI type 2 and the ACK/NACK information are transmitted without data through a PUSCH. That is, in the case A where CQI type 2 is transmitted without data through a PUSCH or in the case B where both CQI type 2 and ACK/NACK information are transmitted without data through a PUSCH, the information is transmitted in uplink after its transmission structure is changed according to the time when SR information is transmitted.

The second case is that SR information is always transmitted in uplink through multiplexing with CQI type 2 or with both CQI type 2 and ACK/NACK information when the CQI type 2 or both the CQI type 2 and the ACK/NACK information are transmitted without data through a PUSCH. In this case, such information structures for transmission without data can be integrated into a single structure and there is no need to take into consideration the case where the time to transmit the SR matches the time when the CQI type 2 or both the CQI type 2 and the ACK/NACK information are transmitted without data through a PUSCH. That is, in the second case, the system does not support the first case.

Two methods can be used to multiplex the SR information with the CQI type 2 or with both the CQI type 2 and the ACK/NACK information.

In the first method, 1-bit SR information is added to the CQI type 2 and is then jointly encoded to be transmitted. That is, SR information is inserted into an existing control information channel and then transmitted.

In the second method, the SR information is encoded separately from the CQI type 2 and the encoded SR information and the encoded CQI type 2 are multiplexed to create a mixture information stream and the stream is then transmitted in uplink through a PUSCH.

The two methods cannot be used together in one system and one of the two methods can be selected according to system operation.

Based on the above description, four cases can be considered when an SR is transmitted through multiplexing according to the present invention.

Figure 12:
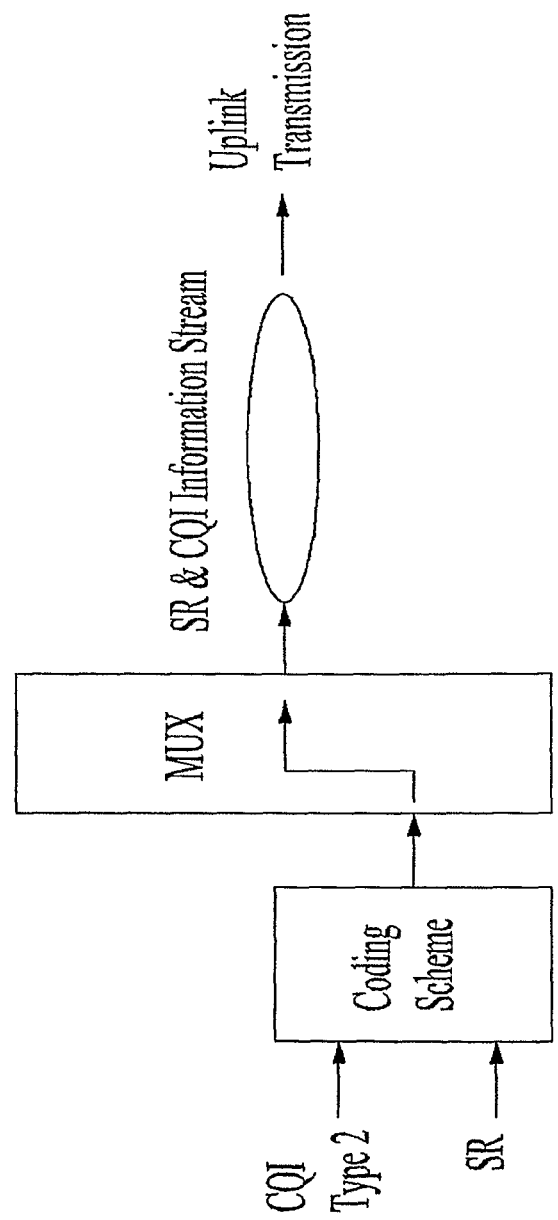
FIG. 12 is a block diagram illustrating the first case where control information is transmitted when there is no need to transmit data in uplink according to the second embodiment of the present invention.

FIG. 12 is a block diagram illustrating the first case where control information is transmitted when there is no need to transmit data in uplink according to the second embodiment of the present invention. In the first case, as shown in FIG. 12, SR information is encoded jointly with CQI type 2 and is then transmitted in uplink through a PUSCH.

Figure 13:
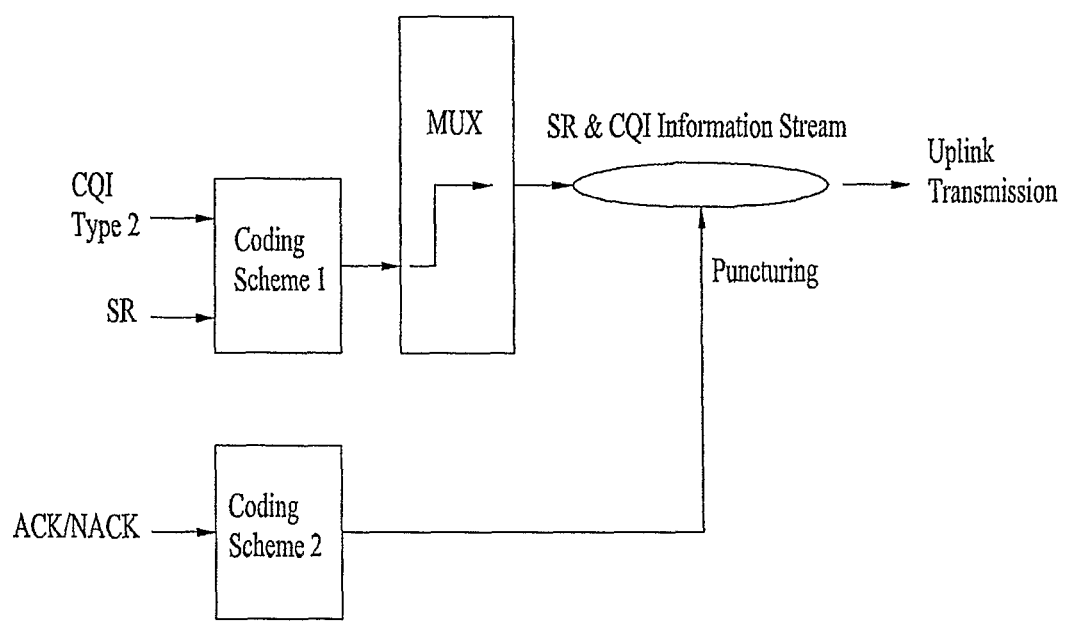
FIG. 13 is a block diagram illustrating the second case where control information is transmitted when there is no need to transmit data in uplink according to the second embodiment of the present invention.

FIG. 13 is a block diagram illustrating the second case where control information is transmitted when there is no need to transmit data in uplink according to the second embodiment of the present invention. In the second case, as shown in FIG. 13, SR information is encoded jointly with CQI type 2 and the encoded SR information and the encoded CQI type 2 are multiplexed together to create an SR/CQI mixture information stream and ACK/NACK information is inserted into the stream through puncturing and the stream with the ACK/NACK information inserted therein is then transmitted in uplink.

Figure 14:
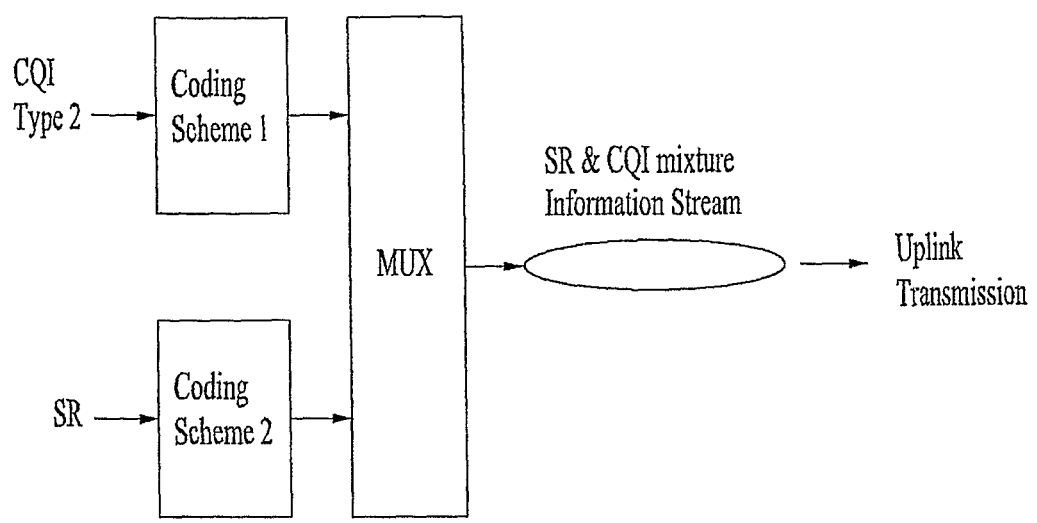
FIG. 14 is a block diagram illustrating the third case where control information is transmitted when there is no need to transmit data in uplink according to the second embodiment of the present invention.

FIG. 14 is a block diagram illustrating the third case where control information is transmitted when there is no need to transmit data in uplink according to the second embodiment of the present invention. In the third case, as shown in FIG. 14, SR information and CQI type 2 are encoded separately and the encoded SR information and the encoded CQI type 2 are multiplexed together to create an SR/CQI mixture information stream and the created stream is then transmitted in uplink through a PUSCH. In one method to multiplex the SR information and the CQI type 2, information bits output through encoding of the SR information and the CQI type 2 are serially concatenated. That is, in this multiplexing method, bits produced through encoding are sequentially linked.

Figure 15:
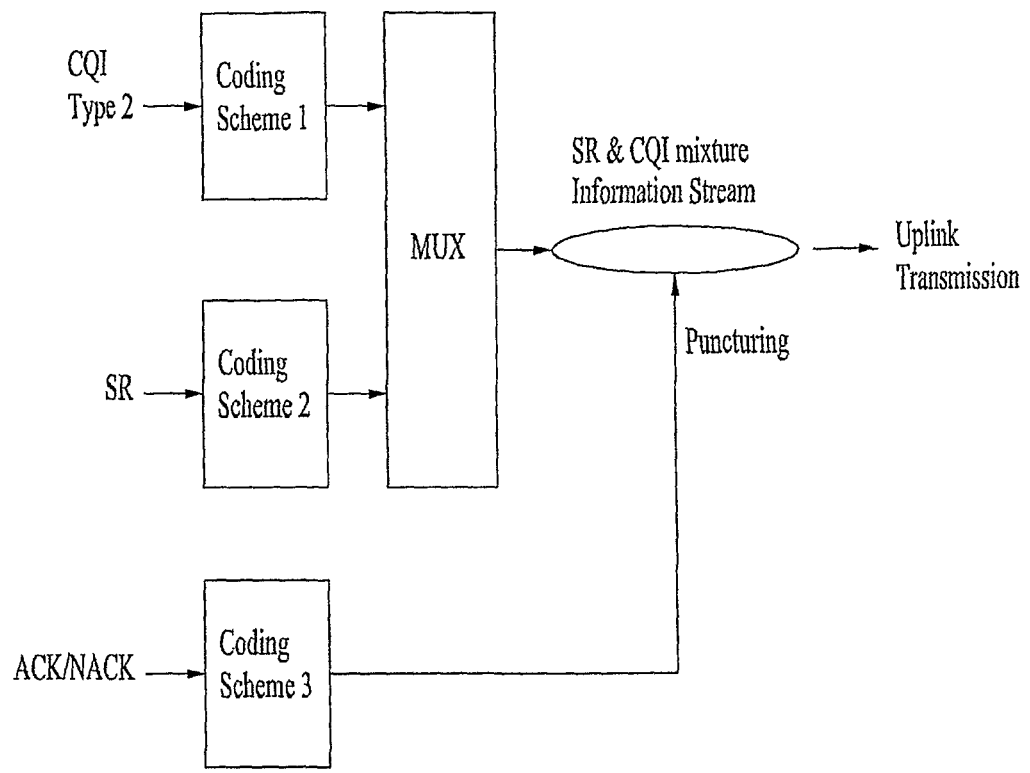
FIG. 15 is a block diagram illustrating the fourth case where control information is transmitted when there is no need to transmit data in uplink according to the second embodiment of the present invention.

FIG. 15 is a block diagram illustrating the fourth case where control information is transmitted when there is no need to transmit data in uplink according to the second embodiment of the present invention. In the fourth case, as shown in FIG. 15, SR information and CQI type 2 are encoded separately and the encoded SR information and the encoded CQI type 2 are multiplexed to create an SR/CQI mixture information stream. ACK/NACK information is then inserted into the mixture information stream through puncturing and the stream with the ACK/NACK information inserted therein is transmitted through a PUSCH.

As is apparent from the above description, in the case where CQI type 2 is transmitted without data through a PUSCH, SR information is not transmitted through a separate PUCCH but instead is transmitted together with the CQI type 2 through the PUSCH, thereby preventing waste of resources while avoiding uplink data transmission delay.

MODE FOR THE INVENTION

Various embodiments have been described in the best mode for carrying out the invention.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be applied to a transmitter and a receiver used in a wireless mobile communication system.

The invention claimed is:

1. A method for transmitting, by a mobile terminal, uplink control information to a base station in a wireless mobile communication system, the method comprising:

transmitting, through a first physical uplink shared channel (PUSCH) by the mobile terminal, channel quality indicator (CQI) type 1 information, which is CQI information configured to be transmitted through a first physical uplink control channel (PUCCH), uplink data and buffer status information indicating whether there is new uplink data input to a buffer queue of the mobile terminal other than the uplink data, when a time for transmission of the CQI type 1 information and a time for transmission of the uplink data match; and transmitting, through a second PUSCH by the mobile terminal, CQI type 2 information, which is CQI information configured to be transmitted through the second PUSCH, and scheduling request (SR) information, which is configured to be transmitted through a second PUCCH at regular intervals, when there is no uplink data to be transmitted at a time for transmission of the CQI type 2 information and when a time for transmission of the SR information and the time for transmission of the CQI type 2 information match.

2. The method according to claim 1, further comprising:
transmitting ACK/NACK information together with the CQI type 1 information, the uplink data and the buffer status information through the first PUSCH when the time for transmission of the CQI type 1 information, the time for transmission of the uplink data and a time for transmission of the ACK/NACK information match; and
transmitting the ACK/NACK information together with the CQI type 2 information and the SR information through the second PUSCH when there is no uplink data at the time for transmission of the CQI type 2 information, when a time for transmission of the SR information and the time for transmission of the CQI type 2 information match, and when the time for transmission of the CQI type 2 information and the time for transmission of the ACK/NACK information match.

3. The method according to claim 1,
wherein the CQI type 1 information has a size less than a predetermined size, and
wherein the CQI type 2 information has a size equal to or greater than the predetermined size.

4. A method for receiving, by a base station, uplink control information from a mobile terminal in a wireless mobile communication system, the method comprising:
receiving, through a first physical uplink shared channel (PUSCH) from the mobile terminal, channel quality indicator (CQI) type 1 information, which is CQI information configured to be received through a first physical uplink control channel (PUCCH), uplink data and buffer status information indicating whether there is new uplink data input to a buffer queue of the mobile terminal other than the uplink data, when a time for reception of the CQI type 1 information and a time for reception of the uplink data match; and
receiving, through a second PUSCH from the mobile terminal, CQI type 2 information, which is CQI information configured to be received through the second PUSCH, and scheduling request (SR) information, which is configured to be received through a second PUCCH at regular intervals, when there is no uplink data scheduled to be received from the mobile terminal at a time for reception of the CQI type 2 information and when a time for reception of the SR information and the time for reception of the CQI type 2 information match.

5. The method according to claim 4, further comprising:
receiving ACK/NACK information together with the CQI type 1 information, the uplink data and the buffer status information through the first PUSCH when the time for reception of the CQI type 1 information, the time for reception of the uplink data and a time for reception of the ACK/NACK information match; and
receiving the ACK/NACK information together with the CQI type 2 information and the SR information through the second PUSCH when there is no uplink data at the time for reception of the CQI type 2 information, when a time for reception of the SR information and the time for reception of the CQI type 2 information match and when the time for reception of the CQI type 2 information and the time for reception of the ACK/NACK information match.

6. The method according to claim 4,
wherein the CQI type 1 information has a size less than a predetermined size, and
wherein the CQI type 2 information has a size equal to or greater than the predetermined size.

7. A mobile terminal for transmitting uplink control information to a base station in a wireless mobile communication system, wherein the mobile terminal is configured to:
transmit, through a first physical uplink shared channel (PUSCH), channel quality indicator (CQI) type 1 information, which is CQI information configured to be transmitted through a first physical uplink control channel (PUCCH) uplink data, and buffer status information indicating whether there is new uplink data input to a buffer queue of the mobile terminal other than the uplink data, when a time for transmission of the CQI type 1 information and a time for transmission of the uplink data match; and
transmit, through a second PUSCH, CQI type 2 information, which is CQI information configured to be transmitted through the second PUSCH, and scheduling request (SR) information, which is configured to be transmitted through a second PUCCH at regular intervals, when there is no uplink data to be transmitted at a time for transmission of the CQI type 2 information and when a time for transmission of the SR information and the time for transmission for the CQI type 2 information match.

8. The mobile terminal according to claim 7, wherein the mobile terminal is further configured to:
transmit ACK/NACK information together with the CQI type 1 information, the uplink data and the buffer status information through the first PUSCH when the time for transmission of the CQI type 1 information, the time for transmission of the uplink data and a time for transmission of the ACK/NACK information match; and
transmit the ACK/NACK information together with the CQI type 2 information and the SR information through the second PUSCH when there is no uplink data at the time for transmission of the CQI type 2 information, when a time for transmission of the SR information and the time for transmission of the CQI type 2 information match and when the time for transmission of the CQI type 2 information and the time for transmission of the ACK/NACK information match.

9. The mobile terminal according to claim 7,
wherein the CQI type 1 information has a size less than a predetermined size, and
wherein the CQI type 2 information has a size equal to or greater than the predetermined size.

* * * * *